Dec. 30, 1952     S. EDELMAN ET AL     2,623,605
FREQUENCY BAND GENERATOR
Filed April 22, 1949

SEYMOUR EDELMAN and
ALBERT LONDON
INVENTORS

BY *Ray C. Hackley Jr.*
ATTORNEY

Patented Dec. 30, 1952

2,623,605

UNITED STATES PATENT OFFICE 2,623,605

FREQUENCY BAND GENERATOR

Seymour Edelman, Silver Spring, and Albert London, Chevy Chase, Md.

Application April 22, 1949, Serial No. 89,072

1 Claim. (Cl. 181—.5)

(Granted under the act of March 3, 1883, as amended April 30, 1928; 370 O. G. 757)

The invention described herein may be manufactured and used by or for the Government of the United States for governmental purposes without the payment to us of any royalty thereon in accordance with the provisions of the act of April 30, 1928 (Ch. 460, 45 Stat. L. 467).

This invention relates to an electronic oscillator, and more particularly to an electronic oscillator whose frequency spectrum consists of a continuous band of frequencies in a limited frequency region and a method of using said oscillator.

The theoretical developments of the methods used in the measurement of sound transmission loss and of sound absorption co-efficients assumes that the sound energy density is uniform throughout the room. One of the means used to approximate this uniformity in practice is the use of a warble note modulated on a carrier frequency to excite as many as possible of the normal modes of the room near a given frequency.

The kind of warble heretofore used has been one in which the frequency varies sinusoidally with time about a central value. It can be shown that the frequency spectrum corresponding to this type of warble consists of discrete side bands spaced symmetrically about the center frequency and separated from each other by a frequency interval equal to the rate of warble. The amplitudes of the side bands vary greatly and sometimes erratically, reaching a maximum at a frequency interval from the center frequency depending on the frequency swing and on the rate of warble and then fall off rapidly.

The normal modes excited in the room will be those corresponding to the side bands present in the exciting signal and the response of any mode will be proportional to the amplitude of the corresponding side band. A sine warble will excite only a comparatively small number of normal modes near the central frequency and the intensity of the excitation will vary in an irregular way from one mode to the next.

A thermal noise generator produces a continuous frequency spectrum over a wide range of frequencies. Attempts have been made to restrict such an output to a limited range by use of a band pass filter. However, this method results in a wave whose amplitude continuously changes and is not suitable for acoustical measurements of the type contemplated in this invention.

It is an object of this invention to provide an oscillator whose frequency spectrum consists of a substantially continuous band of frequencies.

It is a further object to provide an oscillator whose frequency spectrum consists of a continuous band of frequencies smoothly and not too rapidly decreasing in amplitude symmetrically about the central frequency.

It is an object of this invention to provide an oscillator whose frequency spectrum consists of a continuous band of frequencies the width of which band can be varied continuously.

It is a further object of this invention to provide apparatus for making acoustical measurements.

It is also an object of this invention to provide a method of making acoustical measurements.

Additional objects will become apparent to those skilled in the art from the following specification taken in connection with the accompanying drawing, in which.

Figure 2:
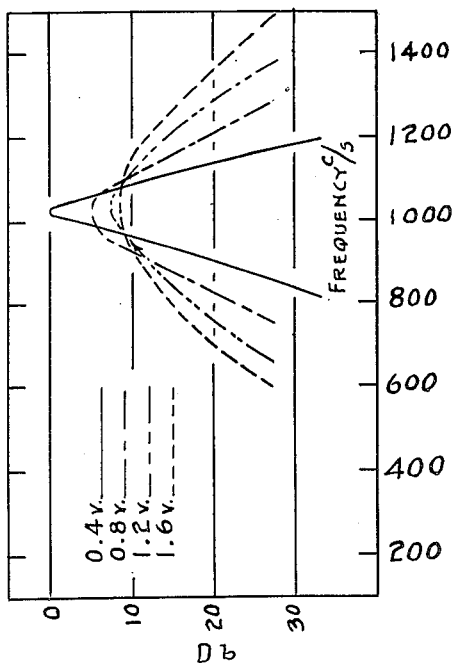
Fig. 2 shows a plot of the frequency spectrum provided by a device constructed in accordance with the principles of this invention.
Figure 1:
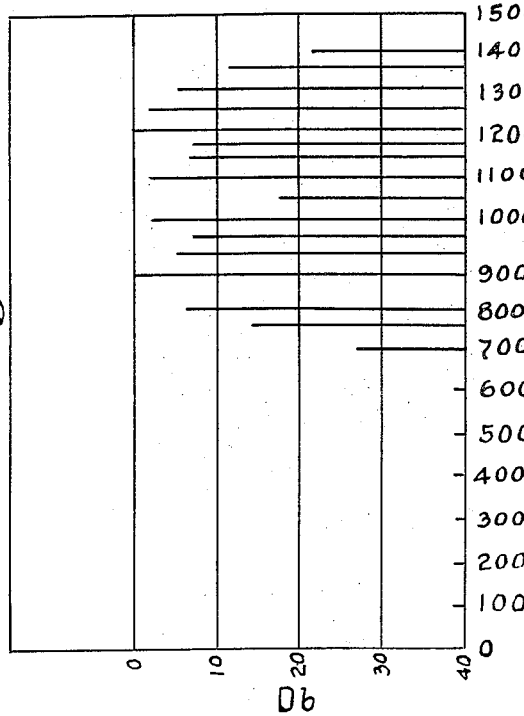
Fig. 1 is a plot showing the frequency spectrum of a 1000-cycle frequency modulated by a 50-cycle sinusoidal warble.

In Fig. 1 is shown the concentration of energy of a 1000-cycle frequency modulated by a 50-cycle warble frequency. It is seen that this energy is concentrated into separate and discrete side bands of varying amplitudes. The use of such a sound wave in the measurement of acoustical characteristics may introduce errors, especially at low frequency.

Figure 3:
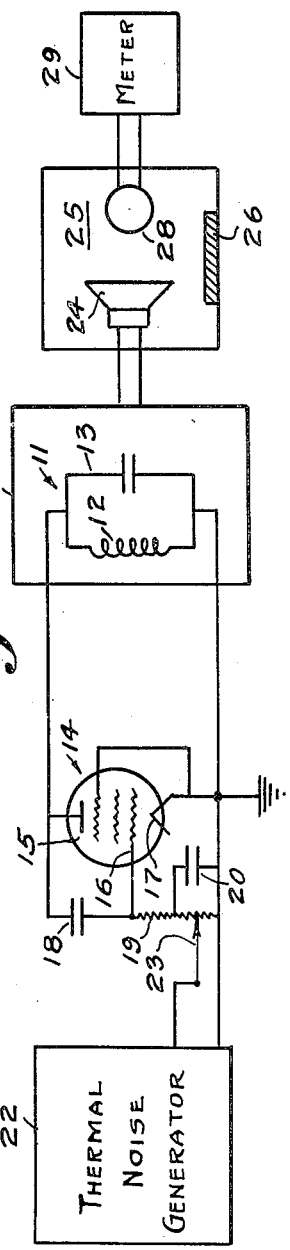
Fig. 3 is a schematic diagram of an oscillator constructed in accordance with this invention used in making sound measurements.

In Fig. 3 a beat frequency oscillator 10 includes a fixed tank circuit 11 comprising an inductance 12 and a capacity 13. Across tank circuit 11 there is connected a reactance tube 14 which includes at least an anode 15, cathode 17, and control grid 16. The anode 15 is connected to cathode 17 through a condenser 18 and a resistor 19. A portion of the resistor 19 nearer the cathode 17 is shunted by a capacitor 20. The reactance tube circuit including tube 14 is similar to one described by H. B. Shaper in the March 1945 issue of "Electronics." Similar circuits are in "Frequency Modulation" by Hund, and in "Theory and Applications of Electron Tubes" by Reich.

There is also provided a thermal noise generator 22. Such generators are well known to those skilled in the art. Generally the thermal noise generator amplifies the output of a gas tube or a resistor in such a way that the energy produced at the output of the thermal noise generator 22 is distributed quite uniformly throughout the audio range. The output of the thermal noise generator 22 is connected between the cathode 17 of tube 14 and a variable tap 23 on the portion of resistor 19 shunted by condenser 20.

Beat frequency oscillator 10 includes two component oscillators normally set to produce two relatively high and slightly different frequencies which are heterodyned to give a relatively low beat frequency output which is the frequency of the beat frequency oscillator 10. One of said component oscillators has means for manually adjusting its frequency. The other of said component oscillators includes tank circuit 11 and is varied in frequency by the thermal noise generator 22 acting in conjunction with reactance tube 14. A beat frequency oscillator is used because each of the component oscillators is of relatively high frequency, and a small percentage frequency change in one of these component oscillators does not materially affect the amplitude of its output but causes an appreciable percentage change in the frequency output of the beat frequency oscillator. The above mentioned manual adjustment on the one component oscillator determines the central frequency, while the adjustment of variables tap 23 determines the width of the frequency spectrum produced by oscillator 10.

The output of oscillator 10 is applied to a loud speaker 24 contained in a room 25. Room 25 may be a reverberation room lined entirely by a material having high acoustical reflection characteristics. A portion of the floor or walls of room 25 may be covered by material 26, the acoustical characteristics of which are to be studied. A microphone 28 is also provided within room 25 for picking up the sound produced therein. The output of microphone 28 is applied to measuring system 29. The reading of meter 29 with and without the material 26 in room 25 gives an indication of the acoustical properties of material 26. It will be understood that the microphone 28 may be moved to different positions throughout room 25 during the measurements or there may be a plurality of microphones 28 distributed throughout the room 25, the outputs of which microphones may be read successively or simultaneously.

The alternative method of using the oscillator herein described is to provide two rooms connected by an opening. In this latter method the material 26 to be studied is placed in the opening; the loudspeaker is placed in one room; and the microphone is placed in the other room.

In the operation of the device described above, the reactance tube 14 is in effect a variable reactance the value of which depends on the current passing through the cathode-anode path of the tube. The cathode-anode current in turn depends on the value of the biasing voltage. As the bias is varied the current through the tube 14 varies correspondingly and the resonant frequency of the tank reactance tube (11—14) combination varies by small frequency increments about the resonant frequency of the tank. If the variations are periodical the frequency spectrum will be made up of side bands whose relative amplitudes will depend on the amplitude and frequency of the variation and be separated from each other by a frequency interval equal to the rate of variation.

However, the output of the thermal noise generator is made up of an infinite number of voltage peaks varying at an infinite number of frequencies all distributed at random. The frequency spectrum corresponding to this random variation of grid bias will be one of side bands of random size and random distance apart changing rapidly in a random manner. The changes are rapid enough so that in any small time interval the side bands coalesce into a continuous band. The changes in frequency are very small in comparison with the resonant frequency of the tank circuit 11 so that the amplitude of the output signal is not affected by the warble.

The electronic warbling method can easily be used for either constant percentage or constant cycle band width in continuously traversing the entire frequency range of the oscillator.

The continuous electrical frequency spectrum band produced by oscillator 10 is applied to the speaker 24 in room 25 and results in a continuous frequency band sound wave which excites the maximum of the normal modes of room 25 near the center frequency produced by oscillator 10 and the reading on measuring system 29 is therefore subject to the minimum amount of error. It will be understood that the modification described above is exemplary only and many changes will occur to those skilled in the art within the scope of the appended claim.

What is claimed is:

In combination an oscillator including a tank circuit, a reactance tube connected across said tank circuit, a thermal noise generator, the output of said noise generator being connected in the input circuit of said reactance tube to vary the effective reactance of said tube and the frequency of said oscillator at a random rate, the variable frequency produced by said oscillator being applied to a sound producing device, said sound producing device being within an enclosure, a microphone being also within said enclosure, and the output of said microphone being applied to a measuring device.

SEYMOUR EDELMAN.
ALBERT LONDON.

REFERENCES CITED

The following references are of record in the file of this patent:

UNITED STATES PATENTS

| Number | Name | Date |
|---|---|---|
| 2,043,984 | Alder | June 16, 1936 |
| 2,207,620 | Hilferty | July 9, 1940 |
| 2,253,975 | Guanella | Aug. 26, 1941 |
| 2,355,338 | Stewart | Aug. 8, 1944 |
| 2,416,307 | Greig | Feb. 25, 1947 |
| 2,455,472 | Curl | Dec. 7, 1948 |

OTHER REFERENCES

Olson—"Elements of Acoustical Engineering" June 1947, C. Van Nostrand Co., New York, pages 390, 483 to 491.